UNITED STATES PATENT OFFICE.

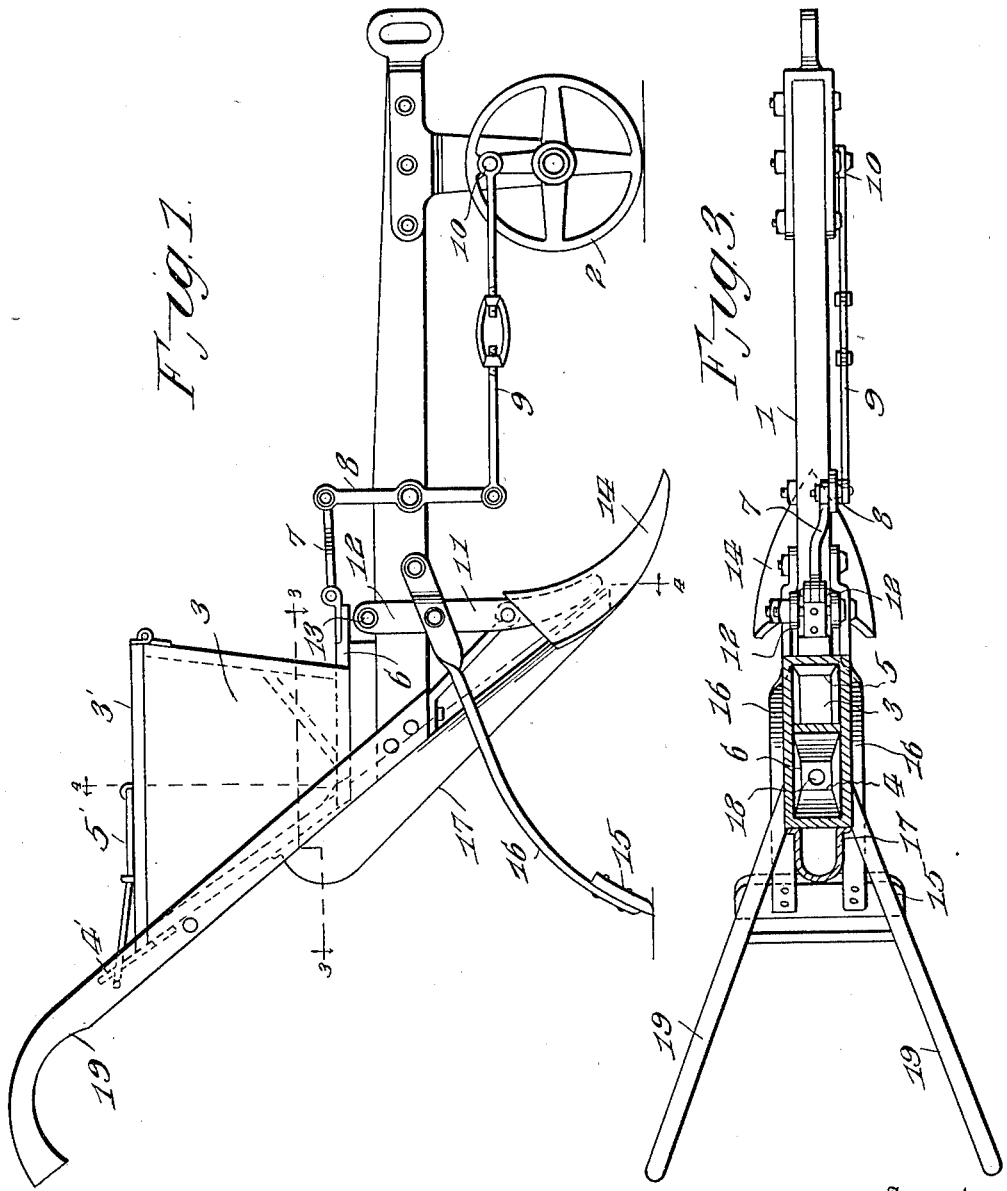

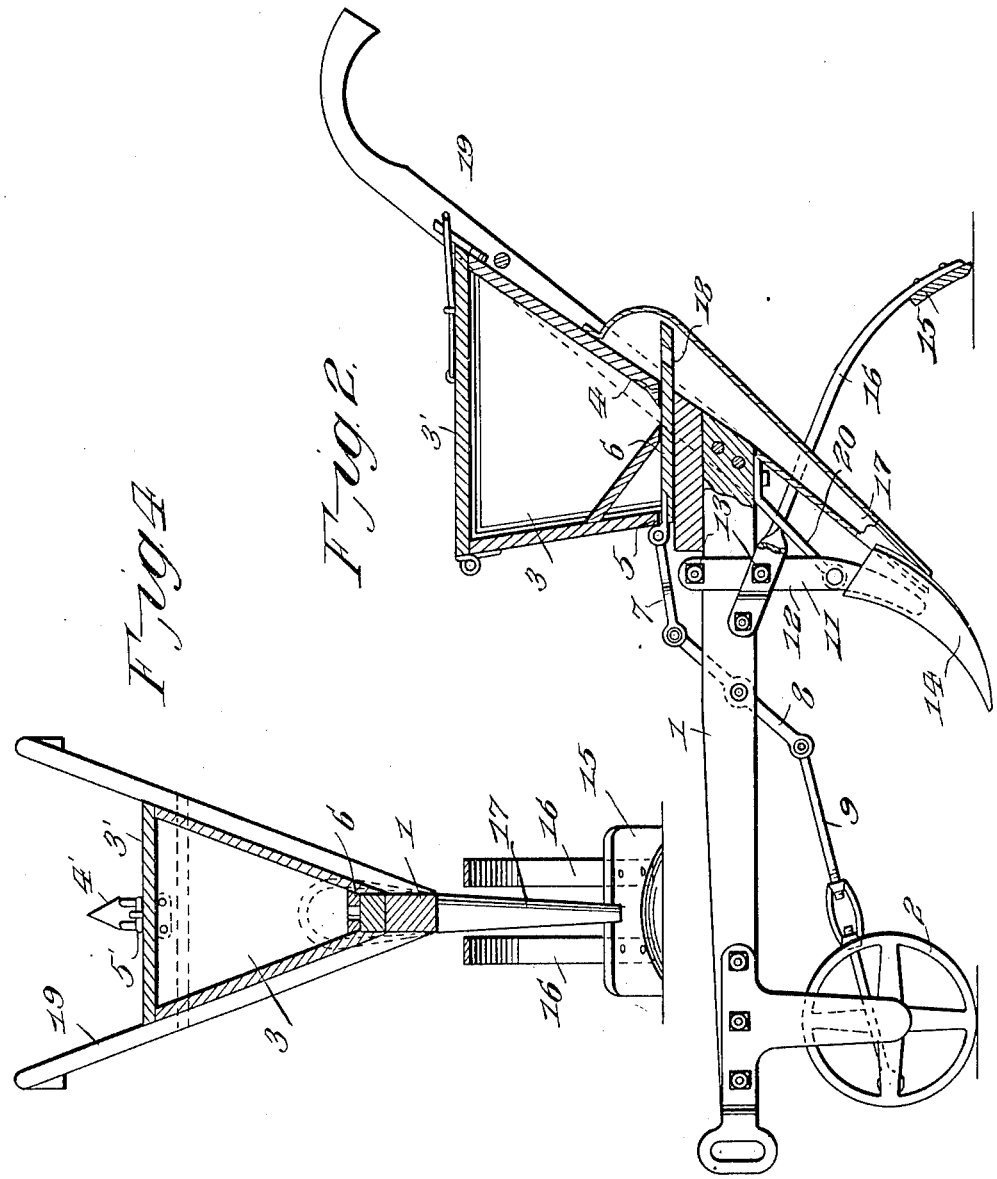

FRANCIS M. PROCTOR, OF GARFIELD, GEORGIA.

PEA-PLANTER.

1,040,753.  Specification of Letters Patent.  Patented Oct. 8, 1912.

Application filed September 30, 1911. Serial No. 652,055.

*To all whom it may concern:*

Be it known that I, FRANCIS M. PROCTOR, a citizen of the United States, residing at Garfield, in the county of Emanuel and State of Georgia, have invented new and useful Improvements in Pea-Planters, of which the following is a specification.

This invention relates to pea planters, and has for an object to provide an improved distributing mechanism therefor which will insure accuracy in the dropping of the peas at the proper intervals upon the ground.

Another object of the invention is to provide a planter which will include a conveying shoe or tube which is designed to place the seed with respect to the coverer, whereby the latter will properly place the same in the furrow.

In the drawings, forming a portion of this specification and in which like numerals of reference indicate similar parts in the several views:—Figure 1 is a side view of the planter. Fig. 2, is a vertical section through the hopper and the supporting beam and the shoe, taken on the line 3—3 of Fig. 1. Fig. 3 is a horizontal section on the line 3—3 of Fig. 1. Fig. 4 is a vertical section on the line 4—4 of Fig. 1.

The planter comprises a draft beam 1 which is operatively supported at its forward end by the wheel 2. At the rear end, the beam supports a hopper 3. The said hopper 3 is located on the rear extremity of the beam and extends in an upward and rearward inclined direction and disposed between and in contact with the handle of the planter thereby supporting the said hopper and preventing the same from having any transverse movement whatever upon the continuous vibrations of the planter. This hopper may be of any suitable well known construction but is preferably provided in its front and rear walls with guide passages 4 and 5 in which the valve member 6 of the dropping mechanism is slidably mounted. The forward end of the valve member is pivotally connected to the end of a link 7, the other end of the said link having pivotal connection with the upper end of a rock arm 8. This rock arm extends downwardly below the beam 1 and it is pivotally connected to the inner end of the actuating rod 9. This actuating rod is pivoted, at 10, to the supporting wheel 2 of the planter and its office is to rock the arm 8 when the planter is moved so that reciprocatory movements will be imparted to the valve bar.

The beam 1 supports a plow standard 11, and as illustrated, this standard includes the side members 12 which are connected together and clamped to the beam 1 by the bolts 13. At the lower end the standard supports a shovel 14 which may be of any approved or well known construction. The covering member which is disposed rearwardly of the plow standard comprises a drag bar 15 and the yieldable supports 16. The supports 16 are secured at their lower ends to the drag bar 15, and at the upper end, the supports are connected to the plow standard and beam respectively, as shown, the lowermost bolt hereinbefore described serving as the means of connection between the support and the plow standard.

The opening 4 at the rear of the hopper opens directly onto the rear end of the beam 1 and immediately behind the opening and secured to the beam is a conveying tube 17. This tube extends downwardly and forwardly and has its effective dropping end disposed between the spaced supports 16 of the coverer 15 so as to center the said discharge end of the tube with respect to the effective covering surface of the coverer.

The valve member 6 of the seed dropping mechanism is provided with a passage 18, the said passage end of the valve member being designed to enter the discharge end of the hopper 3 so that the proper collection of the seed will be effected. The passage end of the valve member is also designed for extension beyond the rear of the beam 1 so that the seed can be accurately placed in conveying tube 17. At the rear, the beam 1 supports handles 19, whereby the planter can be manually guided upon the field. The cover 3' of the hopper is provided with a suitable latch 4' which is designed to engage the keeper 5' on the hopper so as to hold the cover against opening accidentally under the vibrations of the planter when in use. The planter described herein is of simple construction and the specific arrangement of the seed dropping mechanism provides means whereby the seed can be accurately placed in the furrow made by the shovel. A brace 20 connects the plow standard with the beam, as shown.

I claim:

A planter comprising a beam, a ground wheel for said beam, a hopper, said hopper being engaged in discharge relation with respect to the rear of the beam, a valve mounted upon the hopper, a plow supported by the beam, a seed conveying tube secured to the beam and located in the rear and in engagement with the hopper and in the rear of the opening in said hopper, means for operating said valve, said means comprising a link connected with the central forward end of the valve and disposed in parallel relation with a portion of the top face of the beam upon one position of said valve, a rock arm pivotally connected at its intermediate portion to the side of said beam adjacent said hopper, said rock arm being pivotally connected at its extremity to the outer end of said link, an actuating rod pivoted at the lower end of said rock arm and at its other end to said ground wheel, said actuating rod in one position of the valve being disposed below and in parallel relation with the underneath face of said beam.

In testimony whereof I affix my signature in presence of two witnesses.

FRANCIS M. PROCTOR.

Witnesses:
I. D. JOHNSON,
W. C. TUCKER.

Copies of this patent may be obtained for five cents each, by addressing the "Commissioner of Patents, Washington, D. C."